Dec. 4, 1923.

J. P. GILES

RIM TOOL

Filed Jan. 9, 1923

1,476,245

Inventor
J. P. Giles.
By Jack Ashley
Attorney

Patented Dec. 4, 1923.

1,476,245

UNITED STATES PATENT OFFICE.

JAMES P. GILES, OF DALLAS, TEXAS.

RIM TOOL.

Application filed January 9, 1923. Serial No. 611,563.

*To all whom it may concern:*

Be it known that I, JAMES P. GILES, citizen of the United States of America, residing at Dallas, in the county of Dallas and State of Texas, have invented certain new and useful Improvements in Rim Tools, of which the following is a specification.

This invention relates to new and useful improvements in rim tools.

The object of the invention is to provide a rim tool for disjointing and jointing the split rims of automobile wheels for the purpose of removing and replacing the tire casings.

A particular object of the invention is to provide means for spreading the split ends of the rim apart prior to their radial displacement or overlapping. This is important in order to free the latching means and provide for an easy and quick disjointing or breaking of the rim.

A further object is to provide means for adjusting the tool to various widths in connection with a lateral adjustment for applying the tool to the rim.

An object of the invention is to form the ends of the rim engaging fingers so as to remain in the sockets of the rim.

A still further object is to provide an arched or yoke shaped connection between the rim engaging elements, on each side, which makes for an easy disjointing of the ends of the rim.

A construction designed to carry out the invention will be hereinafter described together with other features of the invention.

Figure 1:
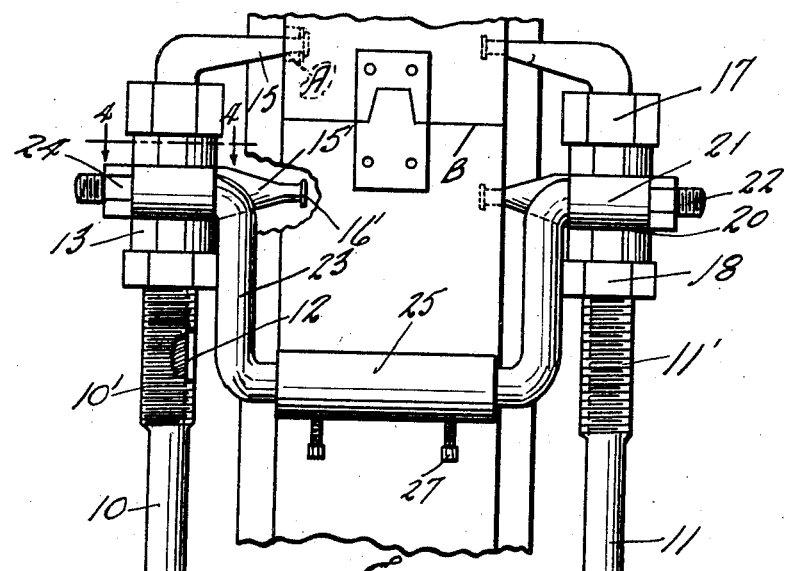
Figure 2:
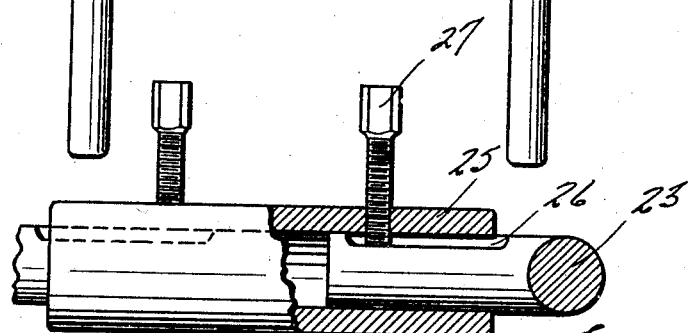
Figure 3:
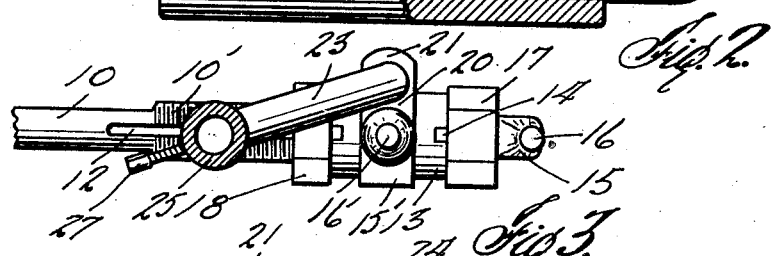
Figure 4:
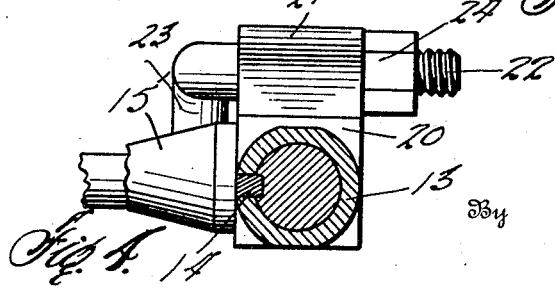

The invention will be more readily understood from a reading of the following specification and by reference to the accompanying drawings, in which an example of the invention is shown, and wherein:

Fig. 1 is a plan view of a tool constructed in accordance with my invention and applied to a rim, Fig. 2 is an enlarged view of the width adjusting sleeve connection, Fig. 3 is a longitudinal sectional view on the line 3—3 of Fig. 1, and Fig. 4 is an enlarged cross-sectional view on the line 4—4 of Fig. 1.

In the drawings the numeral 10 designates a lever having a screw threaded portion 10' which forms one side member of the tool, a similar lever 11 having a threaded portion 11', forming the other side. The inner side of each portion 10' and 11' respectively is provided with a longitudinal key-way 12. An elongated collar 13 is slidable in each threaded portion. Each collar has a key 14 fastened therein, but free to slide in one of the key-ways. This prevents the levers rotating in the collars which are free to slide on the said levers.

Each lever has one end reduced and bent at right angles to form a finger 15, the extremity of which is provided with a button 16. For each collar 13 is provided an adjusting nut 17 engaging the end nearest the finger and a stop nut 18 engaging the opposite end of the collar. Thus by screwing the nuts 17 on the portions 10' and 11', in one direction the collars are slid away from the fingers, the nuts 18 having been previously backed off to permit the sliding of the collars. By reversing the operation the collars may be slid toward the fingers 15.

At the center of each collar is formed a boss 20, from the inner side of which a finger 15' extends inwardly and has a button 16' on its end. The buttons 16' are substantially flush with the buttons 16. The bosses 20 extend above the collars and have ears 21 at the upper ends receiving the trunnions 22 of the angular legs of a yoke or bail 23. The trunnions are shouldered so as to limit their outward displacement in the ears. On the outer screw-threaded end of each trunnion is mounted a nut 24 bearing against the ear.

The legs of the yoke telescope into a sleeve 25 and are provided with grooves 26 receiving set screws 27, whereby the legs may be fastened in the sleeve. By adjusting the legs the width between the collars and levers and the fingers carried thereby may be regulated and thus the tool is set for the width of the rim with which it is to be used.

The rim with which the tool is to be used is provided with notches or sockets A on its side edges or flanges on each side of its split B. The buttons 16 of the fingers 15 are engaged in sockets in one end of the rim and on opposite sides, while the buttons 16' of the fingers 15' are engaged in the sockets in the other end of the rim. The buttons will engage and remain in the sockets more efficiently than the reduced ends of the fingers, otherwise would, and will not be displaced so easily owing to their increased bearing surfaces.

One of the nuts 24 is loosened to spread the fingers so that they may be engaged in the sockets and by tightening said nut the fingers will be held in the rim. The sleeve adjustment is used for different widths of rims.

On each side of the rim the finger 15 will engage the sockets in one end of the rim, while the fingers 15' will engage the sockets in the other end of the rim, the split B lying between the fingers 15 and the fingers 15'. By turning the nuts 17 in a clockwise direction the collars 13 are slid away from the fingers 15, whereby the fingers 15' carry the end of the rim with them. This separates the split ends of the rim sufficiently to disengage any latch connections.

When the ends of the rim have been spread the levers will extend on each side of the rim. The operator places the soles of his shoes on the levers and presses down thereon which distorts the rim ends radially and permits any latch or fastening element to be freed. He next catches hold of the levers and swings the same upwardly and forwardly whereby the fingers 15 become fulcrums and the fingers 15' are swung in an arc concentric thereto. This carries the end of the rim connected with the fingers 15' inward and circumferentially over the other end of the rim, whereby the ends are overlapped and the rim broken so that the casing can be easily removed and replaced. By swinging the levers in the opposite direction the rim is restored to its normal position.

What I claim, is:

1. In a rim tool, a pair of levers having rim engaging elements, a pair of collars slidable on said levers, rim engaging elements carried by the collars, means for adjusting the collars to space their rim engaging elements from the lever rim engaging elements, and means for connecting the collars and the levers together transversely.

2. In a rim tool, a pair of levers having rim engaging elements, a pair of collars slidable on said levers, rim engaging elements carried by the collars, means for adjusting the collars to space their rim engaging elements from the lever rim engaging elements, and a yoke extending transversely between and pivotally connected to the collars, said collars being laterally adjustable on said yoke.

3. In a rim tool, a pair of levers having rim engaging elements, a pair of collars slidable on said levers, rim engaging elements carried by the collars, means for adjusting the collars to space their rim engaging elements from the lever rim engaging elements, and a yoke extending transversely between and pivotally connected to the collars, said collars being laterally adjustable on said yoke, said yoke being laterally adjustable to vary the width between the collars.

4. In a rim tool, a pair of levers, fingers on the ends of the levers, collars adjustable longitudinally on the levers and carrying rim engaging elements, nuts threaded on the levers at each end of the collars for adjusting the same, a yoke comprising legs adjustably telescoping into a connecting sleeve and trunnions pivoted to the collars, and nuts engaging the trunnions of the yoke for confining the collars thereon.

In testimony whereof I affix my signature.

JAMES P. GILES.